Patented Apr. 1, 1930

1,752,793

UNITED STATES PATENT OFFICE

WILLIAM J. HAMMERS, OF GRAND RAPIDS, MICHIGAN, ASSIGNOR, BY DIRECT AND MESNE ASSIGNMENTS, TO LIVERANCE & VAN ANTWERP, A PARTNERSHIP COMPOSED OF FRANK E. LIVERANCE, JR., AND HAROLD O. VAN ANTWERP, OF GRAND RAPIDS, MICHIGAN

WELDING-ROD COATING

No Drawing.    Application filed April 9, 1928.    Serial No. 268,813.

This invention relates to a welding rod coating composition which is designed for use in connection with the electrodes used with the mechanism and process of welding shown in a pending application for patent of myself and Peter Timmer, Serial No. 145,552, filed November 1, 1926, for Arc welding.

In the process of welding where alternating three phase electric current is utilized, two electrodes are placed substantially together or alongside of each other and are directed toward the work which is to be welded which furnishes the third electrode in such processes of electric arc welding. The two electrodes must be electrically insulated from each other and I have discovered and perfected a composition in which the electrodes may be dipped and which composition quickly dries and sets and hardens thereon, the composition after it has been applied to the electrode serving not only as an insulator but also as a welding flux which aids in performing the welding operation, melts and collects as a slag over the weld and from which it can be readily chipped or broken loose.

The composition which I have made for these purposes includes an oxide of iron in powdered form mixed with powdered feldspar, which is an aluminum silicate rock, it also being in powdered form when mixed with the oxide of iron. In practice I use commercial red oxide of iron, though nearly as good results are obtained with brown oxide of iron, while black magnetic iron oxide is in some respects the best as its use gives a smoother weld. It is, however, more expensive and for this reason is not generally used.

The commercial red oxide of iron and feldspar are ground and powdered to very finely divided form so as to pass through a two hundred mesh screen, and may be commercially purchased in such form. The quantity of red oxide of iron used in bulk is twice that of the feldspar used. The same are very thoroughly and intimately mixed and are then placed in a solution of sodium silicate or water glass and distilled water. The solution comprises substantially 60% sodium silicate to 40% distilled water.

The mixed powdered red oxide of iron and powdered feldspar is placed in the solution of sodium silicate and distilled water and a composition made having substantially the consistency of paint. The composition may be made more or less fluid as may be desired but should be of such consistency that the rods can be dipped therein readily and when withdrawn will be coated with the composition. After dipping the rods are allowed to dry for a short time, the sodium silicate rapidly hardening and setting when exposed to the air so that after a period of fifteen or thirty minutes the rods can be handled and placed in a low temperature oven for baking. This baking in effect is merely a rapid evaporation of the moisture of the composition which evaporation and drying would take place eventually in the air but with the low temperature oven the process is materially quickened.

In many instances the electrode rods are dipped into the solution more than one time in order to increase the coating. The coating of composition on the rod when it has been dipped once may be substantially 1/32nd of an inch in thickness, or even less, while repeated dippings multiples this thickness of coating, it being understood that each coating must be somewhat dried and hardened previous to succeeding dipping.

The composition described has proved very practical and satisfactory for coating electrodes used in alternate three phase currents electric arc welding. The coating serves as an insulator so as to electrically separate the electrodes from each other even though they lie closely together and in parallel relation. Also as the ends of the electrodes fuse and melt and deposit on the work which is being welded, the adjacent coating material likewise passes to the work and serves as a very effective welding flux.

While red oxide of iron and feldspar are the essential or fundamental elements which are to be mixed with the solution of sodium silicate and distilled water, I have found that by adding to the mixture of iron oxide and feldspar approximately 10% of its mass of manganese the coating deposited and serving as a flux serves to harden the weld due undoubtedly to the well known proprieties of manganese which chemically united with steel or the like produces a much harder steel.

This invention has been the subject of considerable experiment and trial and has proved to be particularly satisfactory and essential. The claims define the invention and are to be considered as covering all forms of composition coming within their scope.

I claim:

1. The herein described composition comprising, powdered oxide of iron and powdered feldspar in the proportion substantially of two parts in bulk of the oxide of iron to one of feldspar, said mixture being further mixed with a solution of sodium silicate and distilled water in the proportions substantially of 60% sodium silicate and 40% distilled water, the resultant mixture having substantially the consistency of paint.

2. The herein described composition comprising, powdered oxide of iron and powdered feldspar in the proportions substantially of two parts in bulk of the oxide of iron to one of feldspar, said mixture being further mixed with a liquid binding solution, the resultant mixture having substantially liquid consistency, and said binding solution upon evaporation becoming hardened and set.

3. The herein described composition comprising, powdered oxide of iron and powdered feldspar in the proportions substantially of two parts in bulk of the oxide of iron to one of feldspar, and mixed together, said mixture being further mixed with a binding solution, the resultant mixture having substantially liquid consistency, and said binding solution operating to harden and set the entire mixture.

In testimony whereof I affix my signature.

WILLIAM J. HAMMERS.